US006285862B1

(12) United States Patent
Rühl et al.

(10) Patent No.: US 6,285,862 B1
(45) Date of Patent: Sep. 4, 2001

(54) RDS-TMC RADIO RECEIVER INCLUDING A SPEECH SEGMENT MEMORY

(75) Inventors: Hans-Wilhelm Rühl, Solms (DE); Joris H. J. Geurts; Paulus L. G. Moers, both of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/065,795

(22) Filed: Apr. 23, 1998

(30) Foreign Application Priority Data

Apr. 29, 1997 (DE) .......................................... 197 18 132

(51) Int. Cl.[7] .................................................. H04B 1/18
(52) U.S. Cl. .................................. 455/186.1; 455/185.1
(58) Field of Search .......................... 455/186.1, 185.1, 455/45, 130

(56) References Cited

U.S. PATENT DOCUMENTS 5,603,108 * 2/1997 Thoone ............................ 455/186.1
5,752,177 * 5/1998 Siegle et al. ...................... 455/186.1
5,835,854 * 11/1998 Palisson et al. ................. 455/186.1
5,913,157 * 6/1999 Ruhl ................................. 455/186.1
5,991,610 * 11/1999 Ruhl et al. ....................... 455/186.1

FOREIGN PATENT DOCUMENTS

0756261A1 1/1997 (EP) ............................... G08G/1/09

* cited by examiner

*Primary Examiner*—Vivian Chang
*Assistant Examiner*—Eliseo Ramos-Feliciano

(57) ABSTRACT

A receiver which includes a control circuit (7) for delivering encoded messages, derived from a radio signal, to at least one storage device (12, 28), for receiving control data, derived from the encoded messages, from at least one storage device (12, 28), and for forming a speech text for an audio circuit (69) and a display text for a display device (13) from the control data. In order to achieve an acceptable speech text quality, a speech segment memory (14) for storing predetermined speech segments of at least one language is coupled to the control circuit (7). The control circuit (7) forms a speech text with at least a part of the message for which speech segments are stored in the speech segment memory (14). The control circuit (7) is also arranged to form a display text with at least all parts of the message which are not contained in the speech text and for which no speech segments are present in the speech segment memory (14).

16 Claims, 2 Drawing Sheets

RDS-TMC RADIO RECEIVER INCLUDING A SPEECH SEGMENT MEMORY

The invention relates to a radio receiver, including a control circuit for delivering encoded messages, derived from a radio signal, to at least one storage device, receiving control data, derived from the encoded messages, from at least one storage device, and forming a speech text for an audio circuit and a display text for a display device from the control data.

A radio receiver of this kind is known from EP 0 756 261 A1. Audio signals derived from the radio signal received are processed in an audio circuit in this radio receiver. Furthermore, RDS and TMC data is derived from the radio signal. RDS stands for Radio Data System and TMC for Traffic Message Channel. TMC is a functional extension of RDS. RDS-TMC data is transmitted as digital encoded data with the radio signal. TMC enables the radio listener, for example to fetch traffic messages stored in the radio receiver as often as desired, before or after the start of driving, to listen to traffic messages selectively in conformity with the desired route, and to have traffic messages spoken in the listener's native language, regardless of the relevant national language. Hereinafter, the RDS-TMC data will also be referred to in general as encoded messages. It is also feasible to transmit not only encoded traffic messages but also weather reports and other messages by way of RDS-TMC data or similar encoded data. The encoded messages received are applied to a storage device which applies control data to a control circuit in response thereto. A storage device comprises a data file for forming traffic messages and may be, for example a semiconductor memory connected to the control circuit, a semiconductor memory on a chip card, a CD-ROM etc. From the cited document it is known that the control data constitutes designations in an orthographic notation of a language which are to be output as speech. Orthographic is to be understood to mean hereinafter the correct spelling of designations of a language. A message can be reproduced as a speech text by a reproduction device. In order o enable the designations to be output as speech, EP 0 756 261 A1 describes a speech synthesizing circuit which converts the control data into a speech text. Such a speech synthesizing circuit must be very complex so as to achieve an acceptable speech quality.

The TMC data can also be transmitted via the data channel of DAB, GSM or paging systems. These systems must then be interpreted as radio receivers receiving a radio signal with TMC data.

It is an object of the invention to provide a radio receiver which outputs messages in the form of speech and display text, without information restrictions.

This object is achieved by means of a radio receiver of the kind set forth in that a speech segment memory for storing predetermined speech segments of at least one language is coupled to the control circuit, that the control circuit is arranged to form a speech text with at least a part of the message for which speech segments are stored in a speech segment memory, and that the control circuit is arranged to form a display text with at least all parts of the message which are not contained in the speech text and for which no speech segments are stored in the speech segment memory.

The radio receiver according to the invention receives control data from at least one storage device for an encoded message (for example, an encoded traffic message), a speech text for an audio circuit and a display text for a display device being formed from said control data. The control data contains, for example given designations in an orthographic notation (for example, the name of a town) which are stored under a code in a storage device. A speech text is formed from the control data by means of speech segments stored in a speech segment memory. Generally speaking, such a speech segment memory, for example, does not contain the names of all towns in a region. Therefore, a speech text usually cannot use all parts of a message. The parts of the message which are not contained in the speech text, however, are reproduced via the display text. For example, the message "A1, von Recklinghausen in Richtung Wuppertal, zwischen den Anschlußstellen Bochum-Riemke und Autobahnkreuz Bochum: 2 km Stau" ("A1, from Recklinghausen towards Wuppertal, between the junctions Bochum-Riemke and motorway intersection Bochum: 2 km traffic back-up") may appear in the form of a speech text as "A1, von Recklinghausen in Richtung Wuppertal: 2 km Stau" ("A1, from Recklinghausen towards Wuppertal: 2 km traffic back-up") or "A1, von Recklinghausen in Richtung Wuppertal, zwischen den Anschlußstellen 16 und 17: 2 km Stau" (A1, from Recklinghausen towards Wuppertal, between junctions 16 and 17: 2 km traffic back-up). In the first speech text the part of the message "zwischen den Anschlußstellen Bochum-Riemke und Autobahnkreuz Bochum" has been omitted and must appear in the display text while conveying the general meaning. In the second speech text the names "Bochum-Riemke" and "Autobahnkreuz Bochum" have been replaced by a different text with numbers for the junctions "Bochum-Riemke" and "Autobahnkreuz Bochum". The designation for the junctions 16 and 17 will appear in the display text. The formation of the speech text and the display text in this manner makes it possible to use a more economical speech segment memory with a limited number of speech segments.

The speech segment memory stores speech segments of all essential letters and numbers, keywords and geographic names which characterize motorway segments of a region. Junctions and, for example road names are inserted in a display text. It is thus achieved that the speech texts contain adequate information notably for long-distance traffic on the highways.

The above, exemplary speech text contains a substitute designation (for example, "16") for a geographic name (for example, "Bochum-Riemke"). In the region "Deutschland" such a substitute designation for a geographic name corresponds to a junction for the name of a town. A driver receiving a spoken traffic message containing such a substitute designation can thus deal with the substitute designation also without knowledge of the town name. This formation of substitute designations by the control circuit is disclosed in claim 3. Another type of announcement is claimed in claim 4. Claim 5 discloses the control of the output of a display text.

A first storage device may form part of a chip card for introduction into a card reader, and a second storage device may be coupled directly to the control circuit. For the use of a radio receiver in different language zones, at least one storage device contains orthographic notations of a first language as control data, and control data and orthographic notations of at least one further language, in as far as they deviate from those of the first language, and the speech segment memory contains speech segments of a first and at least one further language.

The invention also relates to a module, including a control circuit, for the processing of encoded messages derived from a radio signal.

Embodiments of the invention will be described in detail hereinafter with reference to the Figures. Therein:

Figure 1:
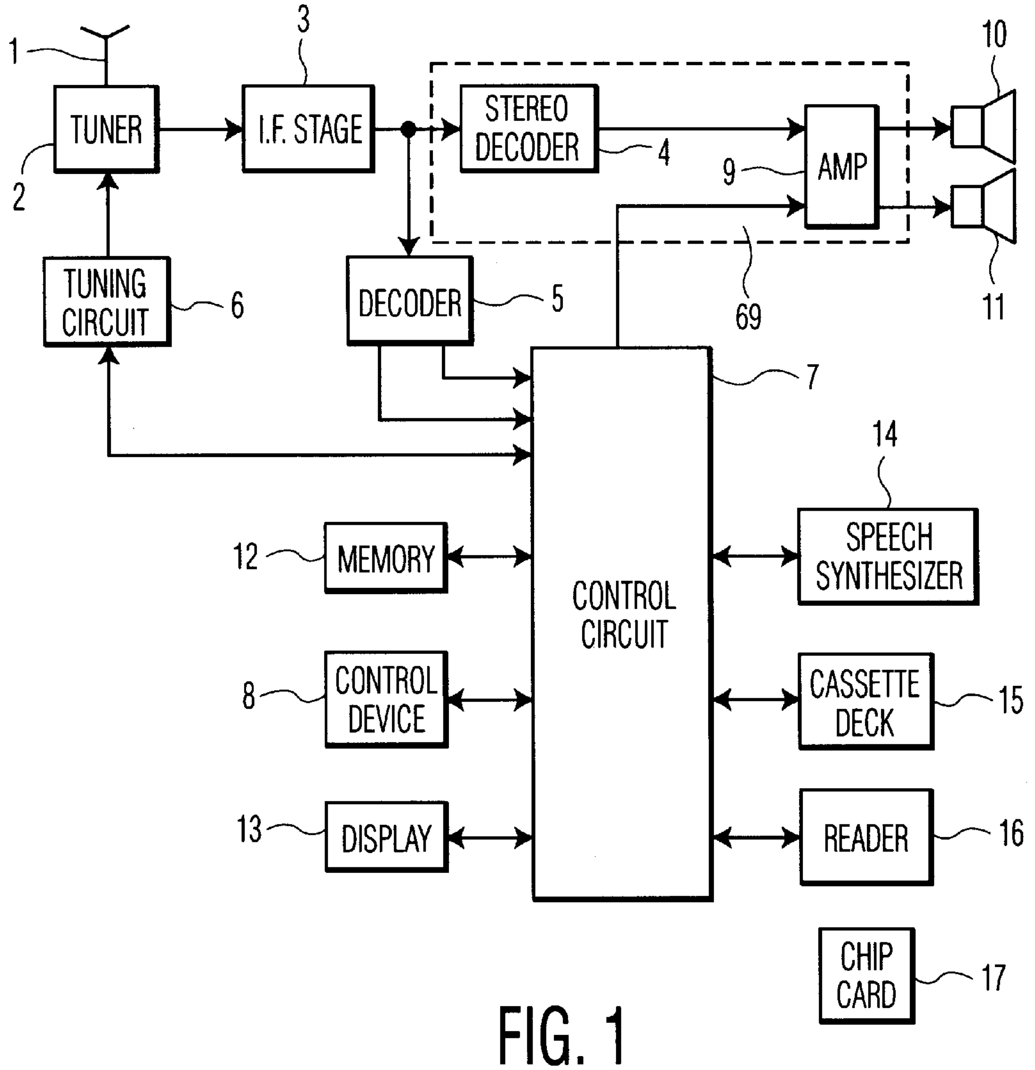
FIG. 1 shows a first embodiment of an RDS-TMC radio receiver.

FIG. 1 shows a radio receiver for the processing of radio signals and for the decoding and further processing of RDS-TMC data. RDS stands for Radio Data System and provides the listener with, for example traffic messages, data concerning alternative frequencies for the station tuned to etc. TMC stands for Traffic Message Channel and constitutes a functional extension of RDS. RDS-TMC data representing encoded messages is transmitted as digital encoded data with the radio signal. TMC enables the radio listener, for example to fetch traffic messages stored in the radio receiver as often as desired before or after the start of driving, to listen to traffic messages selectively in conformity with the desired route, and to have traffic messages spoken in the listener's native language, regardless of the relevant national language.

The radio signal received by an aerial 1 of the RDS-TMC radio receiver (FIG. 1) is applied to a stereo decoder 4 and an RDS decoder 5, via a tuner 2 and an intermediate frequency stage 3. The tuner 2 is controlled by a tuning circuit 6 which is adjusted by a control circuit 7 and a control device 8 connected thereto. The stereo decoder 4 supplies low-frequency stereo signals which are applied to two loudspeakers 10 and 11, via an audio amplifier 9. The stereo decoder 4 and the audio amplifier 9 form an audio circuit 69. The RDS decoder 5 extracts RDS-TMC data from the low-frequency signal supplied by the intermediate frequency stage 3. The RDS decoder 5 applies the RDS-TMC data and a clock signal to the control circuit 7.

A memory 12, a display device 13, a speech segment memory 14 and possibly one or more further devices 15, for example a cassette deck, a CD player, a car telephone etc., are also coupled to the control circuit 7. The memory 12 constitutes a second storage device. A card reader 16 which exchanges data with a chip card 17 for further processing is also connected to the control circuit 7.

Figure 2:
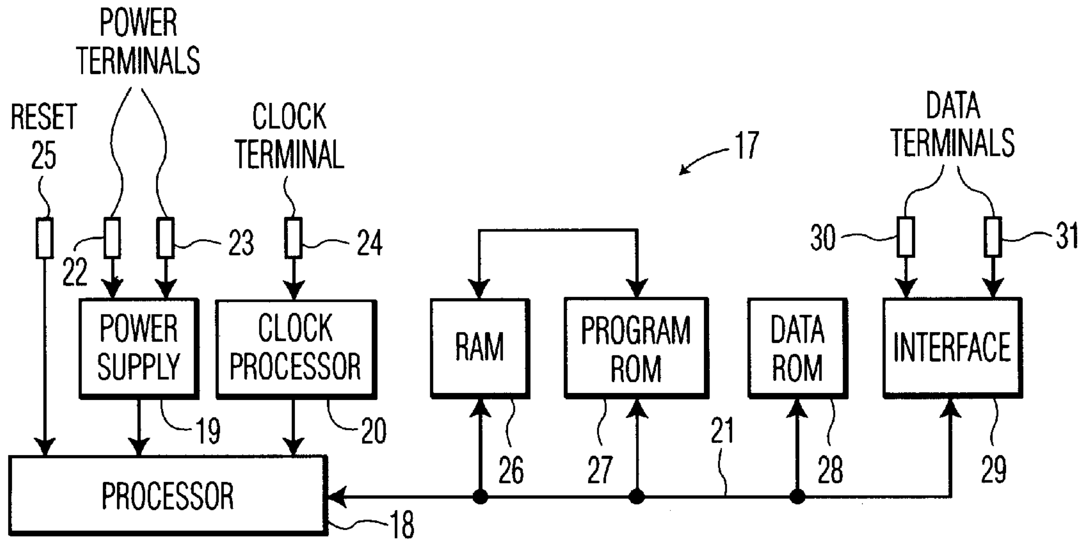
FIG. 2 shows an embodiment of a circuit on a chip card for use, for example in the RDS-TMC radio receiver shown in FIG. 1.

The exemplary circuit accommodated on such a chip card 17 is shown in the form of a block diagram in FIG. 2. The core element of the chip card 17 is a processor 18 which is coupled to a power supply circuit 19, a clock processing circuit 20 and a bus 21. The power supply circuit 19 is connected to two terminals 22 and 23 via which the power supply between the card reader 16 and the chip card 17 is realized. Furthermore, via a terminal 24 the clock processing circuit 20 receives a clock signal from the card reader 16. In the clock processing circuit 20 further clock signals can be extracted from the clock signal. A further terminal 25, via which a reset signal can be supplied by the card reader 16, is connected to the processor 18. A random-access memory 26 (referred to hereinafter as RAM), a read-only memory 27 (referred to hereinafter as program ROM), a read-only memory 28 (referred to hereinafter as data ROM) and an interface unit 29 are coupled to the bus 21. Data is exchanged between the card reader 16 and the chip card 17 via the interface unit 29 and two terminals 30 and 31 connected thereto. The program ROM 27 stores the program required for operation of the processor 18; the RAM 26 contains data which occurs during operation and can be modified, and the data ROM 28 contains the TMC data. At least the data ROM 28 forms part of a first storage device.

The control circuit 7 in FIG. 1 applies a part of the TMC data received, representing respective encoded messages, to the chip card 17, via the card reader 16. The chip card 17 returns data derived therefrom to the control unit 7 which converts this data, with further TMC data derived from the memory 12, into control data. Using the speech segments stored in the speech segment memory 14, a speech text is formed from the control data, which speech text is applied to the audio amplifier 9. The speech text, for example being present in digital form (sequence of binary characters), is converted, in a digital-to-analog converter (not shown) in the audio amplifier, into an analog speech text which is output via the loudspeakers 10 and 11. The control circuit 7 at the same time connects the inputs in the audio amplifier 9 in such a manner that, instead of the stereo signal from the stereo decoder 4, the speech text reaches the loudspeakers 10 and 11, via the audio amplifier 9. Furthermore, the control data in the control circuit 7 is converted into a display text which can be displayed by the display device 13 and read by a user. The contents of the speech text and the display text may differ.

The TMC data thus contains encoded traffic messages which are decoded, using the chip card 17, the memory 12 and the control circuit 7, so as to be converted into a speech text and a display text for the display device 13. The data ROM 28 stores several tables or lists which are used to form control data from the encoded traffic messages. The data ROM 28 of the chip card 17 contains an escape table, a location list, an area location list, and a segment location list. The location list contains location indications, for example towns, motorway exits, ferry terminals. The area location list indicates traffic regions (for example, the Ruhr area), administrative regions (for example, Mittelfranken) or tourist regions (for example, Teutoburgerwald). The segment location list contains road segments.

The escape table serves to compress location and area names. The table stores designations and name components which repeatedly occur in the location list, the area location list and the segment location list. For example, the location list contains not only the location "Köln", but also several city districts such as Köln-Dellbrück, Köln-Kalk, Köln-Porz etc. In order to reduce the location list, it contains an escape notation for the city of "Köln", said escape notation being exactly specified in the escape table. For each designation or name component the escape table contains a respective escape notation which forms an address (for example, 2429) in the escape table, and also the designation or name component to be replaced in an orthographic and possibly a phonetic notation. Examples of entries in a feasible escape table are given hereinafter:

| EC | RS |
|---|---|
| 2209 | Passau |
| 2367 | Dortmund |
| 2388 | Euskirchen |
| 2418 | Oberhausen |
| 2429 | Köln |
| 2438 | Olpe |
| 2444 | Rade |
| 2509 | A1 |
| 2511 | A45 |

In the above abstract from an escape table, for example the notation 2438 represents the location name "Olpe" in an orthographic notation. The first column thus stores the escape code (EC) and the second column stores a designation in an orthographic notation (RS). An orthographic notation is to be understood as the correct spelling of designations of a language.

Frequently used name components (for example, Anschlußstelle, Autobahnkreuz etc.) (junction, motorway intersection) which are not region-specific but traffic-specific, can be stored in an additional escape table in the memory 12 of the RDS-TMC radio receiver instead of in the escape table. Such a feasible additional escape table could contain the following entries:

| EC | RS |
|---|---|
| 0012 | westliches (western) |
| 0018 | Autobahnkreuz (motorway intersection) |
| 0019 | Anschluß-stelle (junction) |
| 0022 | Raststätte (roadhouse) |

For example, the escape code 0019 in the above additional escape table represents the name component "Anschlußstelle" (junction) in an orthographic notation. This part of an escape table contains an escape code (EC) in the first column and a designation in an orthographic notation (RS) in the second column.

For each location the location list contains a location code (for example, 3038) and the location name (for example, Nordrhein Westfalen, Köln) in an orthographic notation. The location code is an encoded message and serves to address the relevant location name. Hereinafter, five examples from the location list are given:

| OC | RS | Meaning |
|---|---|---|
| 3038 | 0018 2438 | (Autobahnkreuz Olpe) (Motorway intersection Olpe) |
| 3109 | Lauf | (Lauf) |
| 3621 | 0019 Kusel | (Anschlußstelle Kusel) (junction Kusel) |
| 3783 | 0019 2429-Dellbrück | (Anschlußstelle Köln-Dellbrück) (junction Köln-Dellbrück) |
| 3796 | 0019 2429-Mühlheim | (Anschlußstelle Köln-Mühlheim) (junction Köln-Mühlheim) |

The above part of a feasible location list contains the location code (OC) in the first column and, in the second column, the location name in an orthographic notation (RS) or in a completely or partly encoded form as an escape code. The above third column is not present in the location list and serves merely to indicate the meaning of the various escape codes in the location list. For example, if the entry under the location code "3038" is to be read by the chip card 17 in an orthographic and a phonetic notation, the control circuit 7 receives the number sequence "0018 2438". The numbers "0018" and "2438" represent escape codes in an escape table. Under the escape code "0018", for example "Autobahnkreuz" (motorway intersection) has presumably been entered in the above additional escape table, and presumably "Olpe" has been entered under the escape code "2438" in the escape table of the data ROM 28. In the control circuit 7 the location name searched under the address "2438" is then composed in an orthographic notation (Autobahnkreuz Olpe) (motorway intersection Olpe).

The area location list contains, for each respective area, an area code (for example, 4803) and an area name in an orthographic notation (for example, Westliches Ruhrgebiet= western Ruhr area). The area code serves to address the relevant area name. Four examples from a feasible area location list are given hereinafter:

| BC | RS | Meaning |
|---|---|---|
| 4803 | 0012 Ruhrgebiet | (Westliches Ruhrgebiet) (western Ruhr area) |
| 4991 | Bayerischer Wald | (Bayerischer Wald) |
| 4994 | Bodensee | (Bodensee) |
| 4996 | Eifel | (Eifel) |

The above part of a feasible area location list contains the area code (BC) in the first column whereas the second column contains the area names in an orthographic notation (RS) or completely or partly in encoded form as an escape code. The third column actually is not present in the area location list and is intended only to indicate the meaning of the individual escape codes in the area location list. For example, the entry "0012 Ruhrgebiet" in the second column (orthographic notation) means "Westliches Ruhrgebiet" (western Ruhr area) under the area code "4803", because the escape code "0012" indicates the name component "westliches" (western).

The following control operations are then performed in the control circuit 7. When the control circuit 7 receives, for example the encoded message "4803", it is applied as an address or location code to the data ROM 28 on the chip card 17. The orthographic entries (0012 Ruhrgebiet) are applied to the control circuit 7 by the chip card 17. The control circuit 7 detects the escape code (0012) and reads the orthographic notation entered under this escape code in the memory 12. For example, on the basis of the first digit the control unit 7 can decide whether it must read from the escape table in the memory 12 or from the escape table in the data ROM 28. The orthographic entry "westliches" is combined with the previously read entry "Ruhrgebiet".

The segment location list contains respective road segments in an orthographic notation and also a segment code which corresponds to an encoded message and serves to address the relevant road segment. Three examples from a feasible segment location list are given below:

| AC | RS1 | RS2 | RS3 | Meaning |
|---|---|---|---|---|
| 5024 | 2511 | 2429 | 2418 | (A3, Köln, Oberhausen) |
| 5108 | 2509 | 2367 | 2388 | (A1, Dortmund, Euskirchen) |
| 5130 | 2511 | 2209 | Linz | (A3, Passau, Linz) |

The segment code (AC) is stated in the first column of the segment location list. The second column contains the road designation in an orthographic notation (RS1) or an escape code which refers to the orthographic road designation in the escape list (for example, 2511). The junctions of the road segments, representing the respective beginning and end of the relevant road segment, are given in an orthographic notation (for example, Linz) or completely or partly in encoded form as an escape code (for example, 2209) in the third and the fourth column (RS2, RS3). The fifth column does not form part of the segment location list but serves to illustrate the meaning of the various escape codes (for example, Autobahn (motorway) A3, Knotenpunkte (junctions) Passau und Linz).

If desired, the location list, the area location list and the segment location list may also comprise further columns for supplying the user of the RDS-TMC radio receiver with further messages relating to given entries in the lists. The location code, the area code and the segment code are, as has already been stated, special names for respective encoded information.

In order to form a meaningful speech or display text in the RDS-TMC radio receiver, a further list with standard phrases is stored in the memory 12. The memory 12 thus contains event-specific control data (in a standard phrase list) and traffic-specific control data (additional escape list). The standard phrase list may contain, for example the following phrases:

| | |
|---|---|
| P1 | Im Bereich <Bereich> (In the area <area>) |
| P2 | Im Stadtgebiet <Ort> In the urban area <town> |
| P3 | <Straβennummer>, von <Knotenpunkt A> in Richtung <Knotenpunkt B>, zwischen Anschluβstelle <Ort A> und <Ort B> (<road number>, from <junction A> towards <junction B>, between junction <town A> and <town B>) |
| P4 | <Straβennummer>, von <Knotenpunkt A> in Richtung <Knotenpunkt B>, <Ort> (<road number>, from <junction A> towards <junction B>, <town>) |
| P5 | Nebel (fog) |
| P6 | Sportveranstaltung (sporting event) |
| P7 | 4 km Stau (4 km traffic jam) |
| P8 | Ausfahrt gesperrt (exit blocked) |
| P9 | zähflieβender Verkehr (slow-moving traffic) |

The standard phrase list contains phrases with given arguments (for example, <Ort>, <Straβennummer>) which must be suitably replaced, for example by location indications or road numbers when a message is composed in the control circuit 7. The phrases can be identified via a code. In the present example, the exemplary phrases are characterized by the codes "P1" to "P9".

The speech segment memory 14 contains given, recorded speech segments which are read by the control circuit 7 and composed so as to form a speech text in dependence on an encoded message or TMC data. Because of the large quantity of location names in the region (for example, Germany) and the limited storage capacity, the speech segment memory stores only selected speech segments. These segments may be all letters from A to Z, given numbers (0 to 20, 30, 40, . . . , 90, 100, etc.) and location names whereby, for example all motorway segments in Germany can be unambiguously identified, as well as the keywords required for the standard phrases ("und" (and), "von" (from), "Anschluβstelle" (junction), "Richtung" (towards), etc.).

When an encoded message contains, for example the part "A 45" (=A fünf-und-vierzig), the control circuit composes this message part from the speech segments "A", "fünf", "und", "vierzig" and applies it to the audio circuit 69.

Because of the limited capacity of the speech segment memory 14, for example junctions cannot be output in the form of their location names in a speech text. Instead, the junctions are announced with the appropriate predetermined numbers (for example, Anschluβstelle 56) (junction 56). As stated above, a location list contains not only the location code and the location names, but also further entries. These entries are, for example the numbers for a junction. A part of a location list with a location code (OC), location name (RS) and numbers (NR) for a junction is given hereinafter:

| OC | RS | NR |
|---|---|---|
| 3089 | Drolshagen | 37 |
| 3090 | Lüdenscheid | 38 |
| 3456 | Hagen-Süd | 39 |
| 2345 | Schwerte | 40 |

The control circuit 7 of the radio receiver may receive, for example an encoded traffic message consisting of the phrases P3 and P7. The phrase P3 indicates that an event has occurred on a given highway segment (<Straβennummer>" (road number), <von> (from) <Knotenpunkt A> (junction A) in Richtung (towards) <Knotenpunkt B> (junction B), zwischen Anschluβstellen (between junctions)—<Ort A> (location A) and <Ort B> (location B)). The control circuit also derives the arguments to be filled in the phrase P3 from the TMC data received. For example, the encoded message contains the code "2511" for the road number, the code "2438" for the junction A, the code "3089" for the junction B and the code "3089" for the location A. The code for the location B is not indicated directly but by a digit which must be added to the number of the location A so as to find the location B. For example, from the location list in the data ROM 28 of the chip card 17 the control circuit 7 receives the location name "Drolshagen" and the number "37" for the code "3089". If the digit to be added is "1", the number "38" is obtained for the location B. At the number "38" the location name "Lüdenscheid" is then found in the location list. The numbers "37" and "38" represent escape designations for the location names "Drolshagen" and "L üdenscheid". The event taking place on the motorway segment denoted by the phrase P3 is given in the phrase P7: "4 km Stau" (4 km traffic back-up).

On the basis of the phrases P3 and P7 and the arguments of the phrase P3, the control circuit 7 forms the following speech text, after extraction of stored speech segments from the speech segment memory 14.

"A 45, von Olpe in Richtung Dortmund, zwischen Anschluβstelle 37 und 38: 4 km Stau" (A 45, from Olpe towards Dortmund, 4 km traffic back-up between junctions 37 and 38).

For this purpose the card reader 16 has read the road number "A 45" for the code "2511", the location name (junction A) "Olpe" for the code "2438", the location name (junction B) "Dortmund" for the code "2367", and for the code "3089" the location name (location A) "Drolshagen" and also the number "37", the foregoing information is applied to the control circuit 7. Because no speech segments for the location names "Drolshagen" and "Lüdenscheid" are stored in the speech segment memory 14, their junction numbers (NR) are spoken.

Furthermore, the control circuit 7 forms a display text from the encoded message for display on the display device 13. For example, the entire message with the designations for the junctions 37 and 38 (A 45, von Olpe in Richtung Dortmund, zwischen Anschluβstelle 37 und 38: 4 km Stau) (A 45, from Olpe towards Dortmund, 4 km traffic back-up between junctions 37 and 38) or only the designations for the junctions 37 and 38 can be displayed. This selection possibility, for example may also be adjustable.

On the basis of selection criteria (not shown) which can be adjusted by means of the control device 8 and are interpreted and processed by the control circuit 7, it is also possible to select a region for which, for example traffic information is output. Because of the limited storage of speech segments, special local traffic information can be reproduced, in detail only via the display device. For example, an encoded message having the following contents "Im Bereich Nürnberg auf der Erlanger Str. zwischen A-Straβe und B-Straβe: Baustelle" (construction site in the Neurenberg area on the Erlanger Str. between A-road and B-road) can be output via a speech text, for example as follows:

"Im gewählten Bereich: Baustelle". Genauere Informationen sind über das Display abrufbar" (In the selected area: construction site. More detailed information can be obtained via the display).

The complete traffic information is reproduced on the display device 13. If only a limited number of characters can be displayed on the display device 13 (for example, in the case of a one-line or two-line display with eight or sixteen characters per line), the traffic message must be called by the user, via the control device 8. After actuation of a given key, the respective traffic message is then displayed in a number of parts. In the case of long location designations it may be necessary to select an appropriate abbreviating writing or a word must be suitably separated. For example, first "N ürnberg" could be displayed; subsequently, after actuation of the relevant key, "Erlanger Str."; after a further actuation of the key, "A-Straβe"; subsequently, after actuation of the key, "B-Straβe"; and as the last word the event "Baustelle" (=construction site) after further actuation of the key. In the case of displays 13 which are only capable of displaying eight characters, location and road designations comprising more than eight characters must be suitably separated and the parts must be successively displayed as called.

Via the control device 8 it is also possible to make further adjustments which are interpreted and processed by the control circuit 7. For example, it can be adjusted whether traffic messages should directly interrupt a current program and which traffic messages should be selected from the messages received, on the basis of criteria which can be defined by the user, so as to be prepared for later or repeated calling.

The above RDS-TMC radio receiver and the chip card 17 are suitable for a user who receives the traffic messages in the German language. Such an RDS-TMC radio receiver, and the chip card 17, can also be arranged for other languages. In that case the corresponding orthographic notation is stored in the memory 12 and in the data ROM 28 of the chip card 17 and the corresponding speech segments of this language will be stored in the speech segment memory 14.

A chip card 17 contains region-specific indications. The data ROM 28 thereof stores region-specific data in such a manner that it can be used for all relevant languages. For example, if it must be possible to use the German, English, French and Dutch languages, the designations possibly stored in the data ROM 28 of the chip card 17 should be extended in conformity with the relevant language in the relevant lists.

Figure 3:
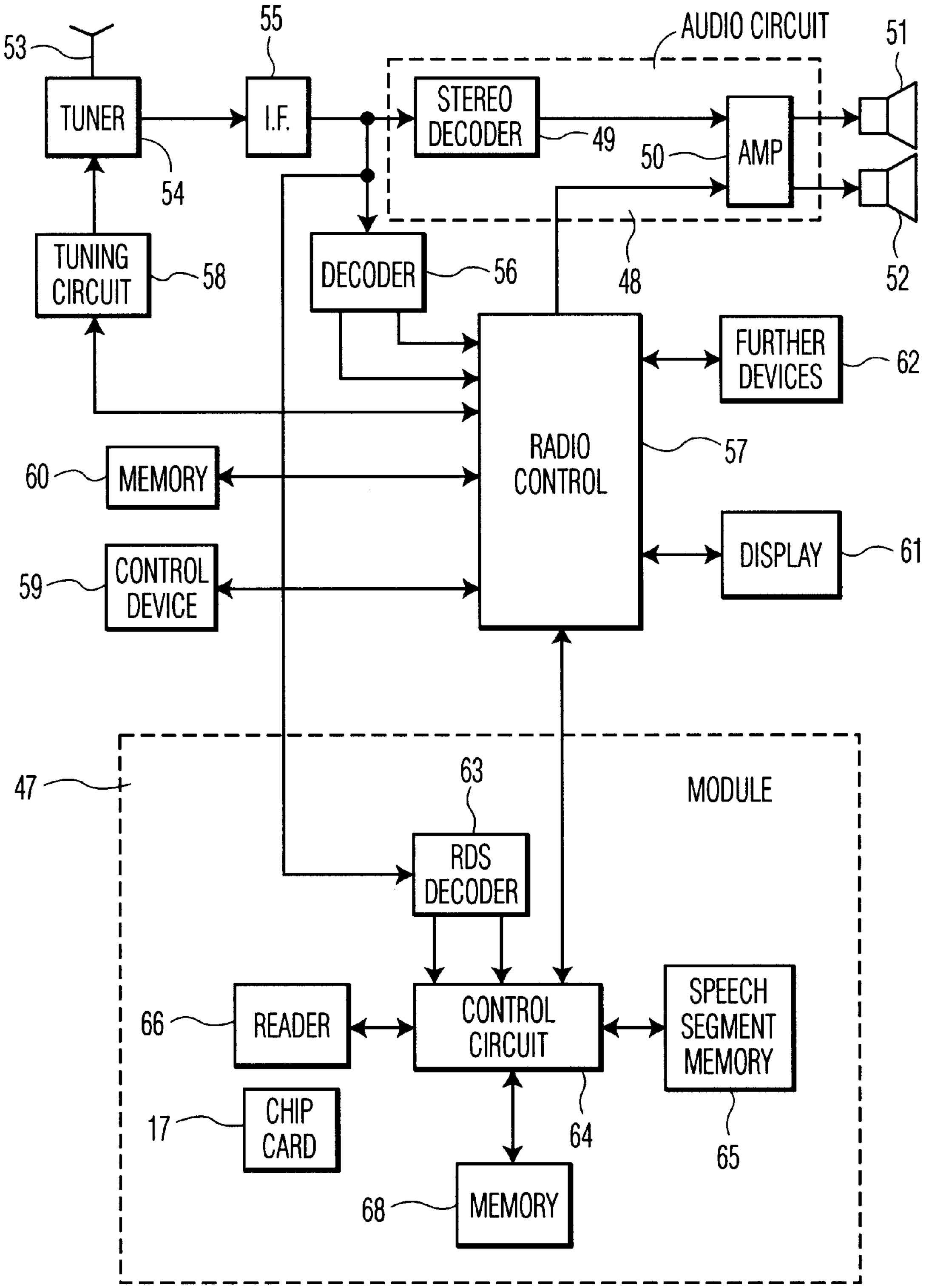
FIG. 3 shows a second embodiment of an RDS-TMC radio receiver which includes a module for the processing of RDS-TMC data which is coupled to the RDS-TMC radio receiver.

FIG. 3 shows a further radio receiver which is coupled to an RDS-TMC module 47 via a plurality of leads. The radio receiver comprises an audio circuit 48 with a stereo decoder 49 and an audio amplifier 50 and two loudspeakers 51 and 52. The audio circuit 48 receives a radio signal which is received via an aerial 53 and is transported via a tuner 54 and an intermediate frequency stage 55. The stereo decoder 49 forms a low-frequency stereo signal which is applied to the loudspeakers 51 and 52, via the audio amplifier 50. The output signal of the intermediate frequency stage 55 is also applied to an RDS decoder 56 and the RDS-TMC module 47. The RDS decoder 56 derives RDS data from the low-frequency signal supplied by the intermediate frequency stage 55. The RDS data and a clock signal are applied to a radio control circuit 57 by the RDS decoder 56. The tuner 54 is adjusted by means of the RDS data and data supplied by a control device 59. To this end, the radio control circuit 57 applies the appropriate data to a tuning circuit 58 which controls the tuner 54.

A memory 60, a display device 61 and possibly one or more further devices 62, for example a cassette deck, a CD deck, a car telephone etc., are also coupled to the radio control circuit 57. Furthermore, the radio control circuit 57 is coupled, via a plurality of leads, to the RDS-TMC module 47 which comprises an RDS decoder 63, a control circuit 64, a speech segment memory 65, a card reader 66 for receiving the chip card 17, and a memory 68. The RDS decoder 63 applies the RDS and TMC data, derived from the output signal of the intermediate frequency stage 55, and a clock signal to the control circuit 64. The control circuit 64, processing RDS-TMC data like the control circuit 7 in FIG. 1, applies TMC data to the card reader 66 and forms, on the basis of the data received from the card reader 66 and further data received from the memory 68, control data which is converted into a speech text and a display text as described above. The display text and the speech text are applied, via the radio control circuit 57, to the display device 61 and the audio circuit 48. The speech text, for example present in digital form (sequence of binary characters), is converted in the audio amplifier 50 of the audio circuit 48, via a digital-to-analog converter (not shown), into an analog speech text which is reproduced via the loudspeakers 51 and 52.

What is claimed is:

1. A radio receiver, including a control circuit (7) for (a) delivering encoded messages, derived from a radio signal, to at least one storage device (12, 28), (b) receiving control data, derived from the encoded messages, from at least one storage device (12, 28), and (c) forming a speech text for an audio circuit (69) and a display text for a display device (13) from the control data, wherein the receiver comprises a speech segment memory (14), coupled to the control circuit (7), for storing speech segments of at least one language, and the control circuit is arranged to form a speech text corresponding to message parts for which speech segments are stored in the speech segment memory (14), characterized in that said speech segment memory stores only predetermined speech segments which are less than all the speech segments required to provide speech text for the entirety of all said messages, whereby, independent of language, at least one part of at least one of the encoded messages has no corresponding speech segment, said control circuit thereby being unable to form any speech text for said one part of said at least one of the encoded messages, and the control circuit is arranged to form a display text with at least all parts of the message which are not contained in the speech text and for which no speech segments are stored in the speech segment memory (14).

2. A radio receiver as claimed in claim 1, characterized in that the speech segment memory (14) is arranged to store speech segments of all essential letters and numbers, keywords and location names which characterize motorway segments in a region.

3. A radio receiver as claimed in claim 1, characterized in that the control circuit (7) is arranged to form, in the case of given messages, a speech text with an escape notation for at least one location name and to form a speech text with the location name.

4. A radio receiver as claimed in claim 1, characterized in that the control circuit (7) is arranged to form, in the case of given messages, a speech text which refers to the display text which reproduces the essential contents of the message.

5. A radio receiver as claimed in claim 1, characterized in that:

the control circuit (7) is arranged to output a display text on the display device (13) in several parts, and the control circuit (7) is arranged to deliver a part of the display text to the display device (13) after actuation of at least one key.

6. A radio receiver as claimed in claim 1, characterized in that:

at least one storage device (12, 28) contains orthographic notations of a first language as control data, control data and orthographic notations of at least one further language, in as far as they deviate from the first language, and the speech segment memory (14) contains speech segments of a first language and at least one further language.

7. A radio receiver as claimed in claim 1, characterized in that at least one storage device (28) forms part of a chip card (17) which is arranged to be accommodated in a card reader (16).

8. A radio receiver as claimed in claim 1, characterized in that the stored speech segments correspond to parts of traffic messages.

9. A module (47) for the processing of encoded messages derived from a radio signal, including a control circuit (64) for (a) delivering encoded messages, derived from a radio signal, to at least one storage device (28, 68), (b) receiving control data, derived from the encoded messages, from at least one storage device (28, 68), and (c) forming a speech text for an audio circuit (48) and a display text for a display device (61) from the control data, wherein the module comprises a speech segment memory (65), coupled to the control circuit (64), for storing speech segments of at least one language, and the control circuit is arranged to form a speech text corresponding to message parts for which speech segments are stored in the speech segment memory (65), characterized in that said speech segment memory stores only predetermined speech segments which are less than all the speech segments required to provide speech text for the entirety of all said messages, whereby, independent of language, at least one part of at least one of the encoded messages has no corresponding speech segment, said control circuit thereby being unable to form any speech text for said one part of said at least one of the encoded messages, and the control circuit is arranged to form a display text with at least all parts of the message which are not contained in the speech text and for which no speech segments are stored in the speech segment memory (65).

10. A module as claimed in claim 9, characterized in that the speech segment memory (65) is arranged to store speech segments of all essential letters and numbers, keywords and location names which characterize motorway segments in a region.

11. A module as claimed in claim 9, characterized in that the control circuit (64) is arranged to form, in the case of given messages, a speech text with an escape notation for at least one location name and to form a speech text with the location name.

12. A module as claimed in claim 9, characterized in that the control circuit (64) is arranged to form, in the case of given messages, a speech text which refers to the display text which reproduces the essential contents of the message.

13. A module as claimed in claim 9, characterized in that:

the control circuit (64) is arranged to output a display text on the display device (61) in several parts, and the control circuit (64) is arranged to deliver a part of the display text to the display device (61) after actuation of at least one key.

14. A module as claimed in claim 9, characterized in that:

at least one storage device (68) contains orthographic notations of a first language as control data, control data and orthographic notations of at least one further language, in as far as they deviate from the first language, and the speech segment memory (65) contains speech segments of a first language and at least one further language.

15. A module as claimed in claim 9, characterized in that at least one storage device forms part of a chip card (17) which is arranged to be accommodated in a card reader (66).

16. A module as claimed in claim 9, characterized in that the stored speech segments correspond to parts of traffic messages.

* * * * *